United States Patent [19]

Weber et al.

[11] Patent Number: 4,762,796
[45] Date of Patent: Aug. 9, 1988

[54] PH CONTROL OF A PROCESS STREAM

[75] Inventors: Richard Weber, Humble, Tex.; Loren H. Haag, Denville, N.J.

[73] Assignee: Exxon Research and Engineering Company, Florham Park, N.J.

[21] Appl. No.: 308,467

[22] Filed: Oct. 5, 1981

[51] Int. Cl.$^4$ .................... G05D 21/00; G05D 7/00
[52] U.S. Cl. ........................... 436/55; 422/62; 422/108; 422/111; 436/163
[58] Field of Search ............ 422/108, 111, 62; 436/163, 50, 55

[56] References Cited

U.S. PATENT DOCUMENTS

| | | | |
|---|---|---|---|
| 3,069,242 | 12/1962 | Brooks et al. | 422/62 |
| 3,180,699 | 4/1965 | Ballestra | 436/55 X |
| 3,791,793 | 2/1974 | Friedmann et al. | 436/163 X |
| 4,033,871 | 7/1977 | Wall | 210/96 |
| 4,121,767 | 10/1978 | Jensen | 239/71 |
| 4,164,547 | 3/1979 | Simko | 422/111 X |
| 4,181,951 | 1/1980 | Boeke | 364/499 |
| 4,224,283 | 9/1980 | Potts | 422/111 |

OTHER PUBLICATIONS

Perry, Chemical Engineers' Handbook, 1973, 21–25.
Instruments & Control Systems, Jan. 1976, vol. 49, No. 1, "Flue-Gas Scrubbing, Part II: Control Systems" by F. C. Shinskey.

*Primary Examiner*—Michael S. Marcus
*Assistant Examiner*—Robert J. Hill, Jr.
*Attorney, Agent, or Firm*—Robert S. Salzman; Joseph J. Dvorak

[57] ABSTRACT

The invention features a unique pH control system and method for maintaining the proper pH in a continuous process stream. The system backmixes a sample stream, which decreases the dynamic gain of the control system, and which allows for the ease of adding a controlled amount of reagent or buffer to the process stream on a continuous basis.

8 Claims, 2 Drawing Sheets

PH CONTROL OF A PROCESS STREAM

FIELD OF THE INVENTION

This invention relates to an apparatus and method for controlling the pH of a process stream, and more particularly to a process and system for controlling the pH of a continuous effluent stream by the continuous addition of a reagent.

BACKGROUND OF THE INVENTION

Emissions and effluents from industrial processes often require the removal or neutralization of offensive substances before they can be discharged into the environment. One such emission is that from a fluid catalytic cracker regenerator, which emission requires the removal of sulfur. The sulfur from the gaseous emission is generally removed by wet gas scrubbing. The gases sent into the air are freed of sulfur, but the effluent scrubber stream, however, requires neutralization of the sulfuric acid formed by the absorbed sulfur.

Also, in processes requiring a sulfite oxidation reactor basin, the acidic effluent from the basin must be carefully neutralized before it can be discharged into the environment.

In waste water treatment caustic, and/or acid is often added to effluent streams to neutralize them (control pH) before they are allowed to exit to the environment.

In cooling tower operation, it is important to control pH in order to minimize the risk of foulant formation.

The present invention is concerned with the neutralization, or otherwise control of the pH, of effluent process streams.

In the past, it has been known to construct large backmixing facilities to capture the process stream and to allow for the thorough mixing thereof, in order to properly analyze and treat the effluent. Backmixing facilities were used in order to provide needed stable control of the pH. Without them, pH due to its highly non-linear behavior, could not be automatically controlled. Backmixing vessels also provide the side benefit of thorough mixing of the effluent stream needed to avoid large variations in effluent pH. These facilities were expensive to construct, and often required many hours to add and thoroughly mix a neutralizing reagent into the captured effluent.

In the case of a sulfite oxidation reactor basin, there is often a holdup time of twenty hours. While in the reactor basin the oxidation reaction is continuously proceeding and byproducts are continuously formed which modify the reagent addition requirements for reaching neutralization. Therefore, the amount of reagent required to neutralize the stream cannot be known without completion of the oxidation reaction. With the prior art system, it could not be known for twenty hours whether the proper amount of neutralizing reagent had been added (a hit or miss proposition). Moreover, modification of the reagent addition rate based upon the current basin outflow pH would not result in proper neutralization of subsequent effluent due to continuous changes in the effluent composition. The invention provides a means of continuous reagent additions to insure continuous neutralization at the basin outflow.

To the best of our knowledge and belief, in a process stream having low buffering (highly logarithimic reagent reaction characteristic) no one has successfully added neutralizing reagents on a continuous basis to a flowing process stream without the use of a backmixing vessel. This is so, because the logarithmic definition of pH, imposes stringent requirements on the pH control system's resolution, rangeability and dynamic response. In other words, the non-linearity of the neutralization process requires a control response which cannot keep pace with the instantaneous pH readings.

From a pH control standpoint, the use of a large backmixing facility reduces the dynamic gain of the system, such that neutralization can be more easily achieved.

The present invention has as one of its objectives to control the pH of a process stream on a continuous basis, while eliminating the need for costly backmixing facilities.

The present invention also seeks to provide a system and method for controlling the pH of a process stream in a quick, efficient manner.

The present invention achieves the stability of effluent stream composition by replacing the process stream backmixer with the far less costly sample stream mixer.

These and other objects of this invention will be better understood and will become more apparent with reference to the following detailed description considered in conjunction with the accompanying drawings.

DISCUSSION OF RELATED ART

The United States patent to Allison, U.S. Pat. No. 2,063,140 describes a control process for pH monitoring wherein a sample from a stream is injected with an indicator and passes through an analyzer. The analysis is used to control the addition of acid or base (reagent) to the process stream. A mixer is utilized to mix the reagent with the process stream.

The present invention differs from the related art in that a sample is obtained from a process stream and is averaged by backmixing in a small vessel. The averaged sample is continuously analyzed to control the pH of the stream on an upstream portion thereof. Therefore, the dynamic response of the system is reduced, and pH control is accomplished on a continuous basis.

BRIEF SUMMARY OF THE INVENTION

This invention pertains to a method and system for controlling the pH of a continuous process stream.

A conduit for conveying the process stream is substantially, continuously sampled. The continuous sample is averaged in a small backmixing vessel and substantially, continuously analyzed for pH. Reagent is added by a pH control means on a substantially, continuous basis in an upstream portion of the process stream in response to the pH analysis.

The system may also comprise a small vessel for performing rapid oxidation of the backmixed sample prior to pH analysis. This oxidation vessel is used in a system having an oxidation basin or alternate oxidation facilities downstream of the control system.

A static mixer upstream of the backmixing vessel is used to mix the reagent into the process stream. The static mixer need be included only if the effluent line is not, of itself, long enough to provide sufficient opportunity for cross-sectional mixing.

The pH control system can be used in combination with a wet-gas scrubber for neutralizing the acidity of the wet-gas scrubber effluent.

The continuous pH control system of this invention has applicability in a variety of systems and is not to be interpreted as being limited to any particular process.

DETAILED DESCRIPTION OF THE INVENTION

Generally speaking, the invention features a continuous pH control of a process stream. It is often desirable to control the pH of a continuous process stream by the addition of a reagent. The pH process is inherently non-linear by virtue of the logarithmic definition of pH. The non-linearity for a specific process is affected by the type and concentration of buffers which are present in the process stream and which may be variable on a continuous basis. This non-linearity can impose stringent requirements on the pH control system's resolution, rangeability and dynamic response. In order to moderate the stringency of the control task, it is common practice to introduce a large backmixed vessel into the process stream as illustrated in the prior art system of FIG. 1.

Figure 1:
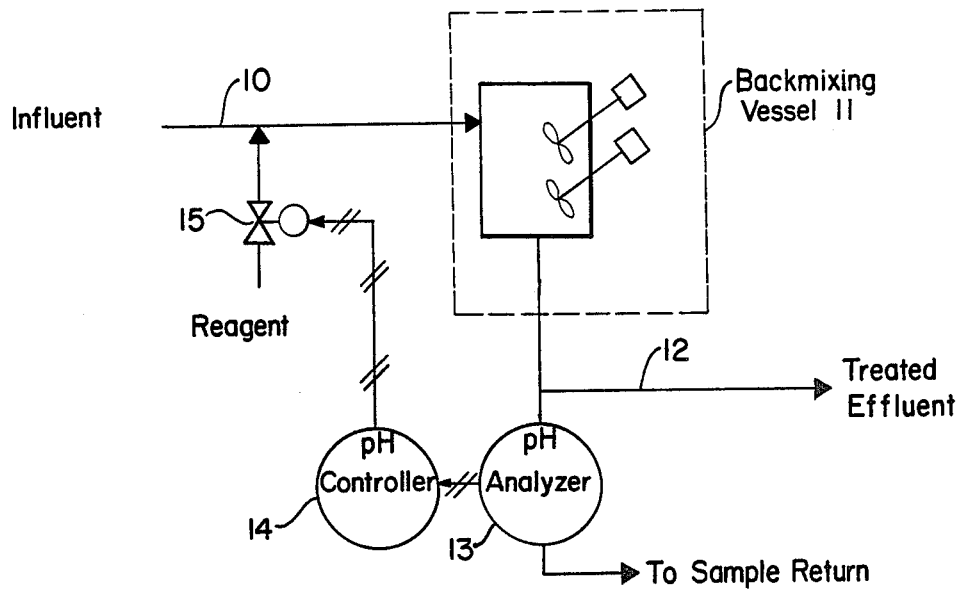
FIG. 1 is a schematic diagram of a prior art system using a large backmixing facility to treat a process stream effluent.

The prior art system of FIG. 1 features in schematic diagram a conduit 10 for conveying a process stream. The stream is fed to a large backmixing vessel 11, from which it is discharged to the environment via conduit 12. The backmixed stream is analyzed by a pH analyzer 13, which controls a pH feedback controller 14, which in turn actuates appropriate valves 15 for adding a given amount of pH buffer to line 10, as shown.

From a control standpoint the primary purpose for introducing the backmixed vessel is to reduce the dynamic gain of the process. The extent of the gain reduction is a function of the degree of backmixing. The backmixed vessel might also serve other process functions such as uniformally distributing the reagent, "averaging" the final pH of the process stream or providing holdup in the process system.

Such a system is more fully described in the text of: Shimskey, F. G., *pH and pIon Control in Process and Waste Streams,* John Wiley and Sons, New York, 1978.

Figure 2:
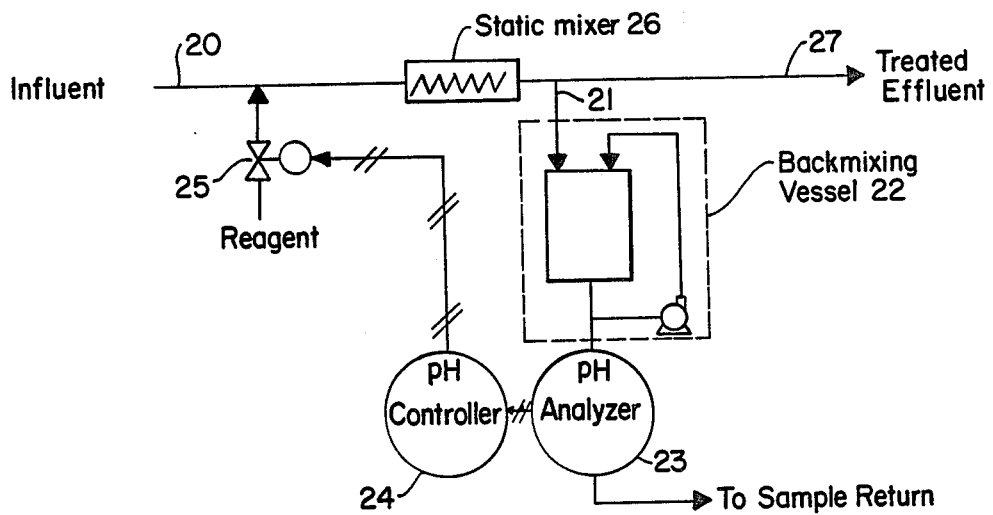
FIG. 2 is a schematic diagram of a pH control system for a process stream, in accordance with the invention.

The invention as shown in FIG. 2, features a process stream carried by a conduit 20. A continuous sample is drawn from conduit 20 via line 21, which sample enters a small backmixing vessel 22, as depicted.

A continuous pH analysis of the backmixed sample is performed by analyzer 23, such as Uniloc Model 1003. The analyzer 23 feeds an electrical signal to a feedback controller 24, such as Honeywell TDC 2000 or Foxboro Spec 200, indicative of the instantaneous pH of the backmixed sample. The feedback controller 24 in response to the analyzer signal operates appropriate valving 25 to add a pH buffer (reagent) into an upstream portion of conduit 20, as illustrated. A static mixer 26, such as Komax 3D Mixer, Komax Systems Inc., Long Beach, CA, is used to mix the reagent into the process stream, which flows as treated effluent to exit 27.

The replacement of a small backmixing vessel 22 disposed in the sample stream 21, for a large backmixing vessel 11 disposed in the effluent stream (FIG. 1) insures a sizeable cost saving. Moreover, the design of the large vessel 11 is more complicated due to the need to contain hazardous gases freed in the reaction.

In addition, the use of a small backmixing vessel 22 in the sample stream insures a more complete backmixing, such that maximum gain reduction can be achieved for the inventive system.

With the typical arrangement illustrated in FIG. 1, the reagent is added to the influent before entering the backmixed vessel. In addition to dispersing the reagent, the backmixed vessel decreases the dynamic gain of the process (i.e. averages the sample). Since the pH analyzer sample point is downstream of the backmixed vessel, the reduced dynamic process gain is what is seen by the pH feedback control system. Because of the reduced dynamic gain, stable control can only be achieved with reduced reagent delivery resolution and less dramatic non-linear gain in the feedback controller. With the invention, however, the reagent is dispersed by a static mixer upstream of the pH analyzer sample point (this also assures a representative sample). The sample is then backmixed resulting in a reduced dynamic gain as seen by the feedback control system with the previously stated benefits to the control system in terms of reduced requirements for reagent delivery resolution and controller gain characteristics.

The treated effluent from the invention of FIG. 2, unlike that of FIG. 1, is not "averaged" (the pH along the effluent line may vary substantially) because of the absence of backmixing. This is typically not a problem since there is often some sort of downstream process capacity which will serve to "average" the instantaneous pH variations. When "averaged", however, the resultant final pH will be the same as seen by the pH analyzer (the desired control pH value).

The concept of backmixing only an analyzer sample stream, rather than the entire process stream is applicable to control of any process where backmixing is necessary to achieve a dynamic gain reduction.

Figure 3:
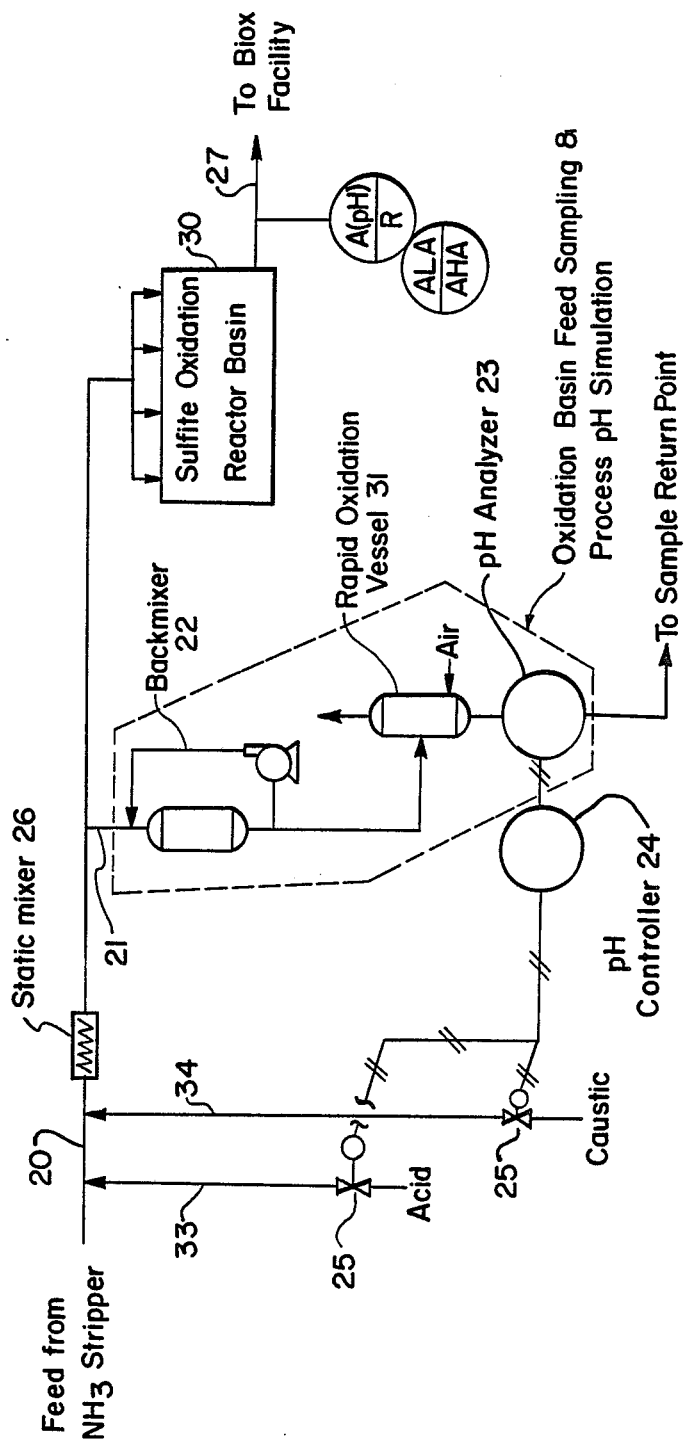
FIG. 3 is a schematic diagram of an alternate embodiment of the system illustrated in FIG. 2.

Now referring to FIG. 3, an alternate embodiment to that of the invention of FIG. 2 is shown. Like components have been given the same numerical designation for the sake of brevity.

This sytem features the addition of a downstream sulfite oxidation reaction basin or alternative oxidation facilities 30. The process stream is fed to the basin 30 where it is oxidized, which in turn generates sulfuric acid in the stream, and which in turn decreases its pH.

Caustic or acid is added upstream of the oxidation basin such that the effluent pH will be about 7. The holdup of the basin is on the order of 20 hours making normal feedback control impossible. The pH control technique of FIG. 3, involves use of a backmixing vessel 22 in the pH analyzer sample line 21 as before. A rapid oxidation vessel 31 is added after the backmixing vessel 22 in the analyzer sample stream 21. Reagent is injected into the feed line 20 via lines 33 and 34 and mixed in a process static mixer 26 which disperses the reagent and assures a representative analyzer sample. A small portion of the feed is taken into the sample system where it first passes through a backmixing vessel 22. The backmixing vessel provides a dynamic gain reduction which decreases the resolution and dynamic response requirements of the control system. The backmixing vessel would be designed for a nominal holdup (consistent with overall sample system dead time) and better than 90% backmixing. (If reagent addition were controlled based upon the pH at the outlet of the backmixed vessel, this would be the equivalent of controlling the inlet pH to the oxidation basin 30. Therefore, no automatic compensation would be made for the varying affect of acid formation). The sample then passes through an oxidation vessel 31, where complete (or nearly complete) oxidation is carried out with a brief (5-10 minute) holdup. The sample then goes to the pH analyzer 23. The pH analyzer signal is used in a feedback control scheme to regulate the reagent addition. The sample is returned to the process at some suitable downstream location. The remainder of the pH control system (controller 24 and reagent addition pumps or valves 25) can be designed to meet the requirements of this application. The oxidation basin feed sampling & process pH simulation offers a unique solution to an otherwise difficult pH control problem.

Having thus described this invention, what is desired to be protected by Letters Patent is presented in the following appended claims:

What is claimed is:

1. A method of controlling the pH of a continuous process stream, comprising the steps of:
   (a) obtaining a substantially continuous sample of a process stream;
   (b) backmixing solely said sample;
   (c) substantially continuously analyzing the pH of said backmixed sample; and
   (d) substantially continuously adding a reagent to an upstream portion of said process stream to control the pH of said sample stream in response to the pH analysis of the backmixed sample.

2. The method of claim 1, further comprising the step of:
   (e) statically mixing the added reagent into said process stream.

3. The method of claim 1, further comprising the step of:
   (e) rapidly oxidizing the backmixed sample prior to the analyzing step (c).

4. The method of claim 3, further comprising the step of:
   (d) statically mixing the added reagent into said process stream.

5. A system for controlling pH of a continuous process stream comprising:
   a main process stream conduit providing substantially continuous conveyance of a process stream;
   a backmixing vessel coupled to said main process stream conduit for receiving a substantially continuous sample of said process stream, said backmixing vessel functioning to backmix solely said sample and provide a process stream sample average of the pH of said sample;
   inlet means for adding at least one reagent to said main process stream conduit upstream from the point at which said backmixing vessel is coupled to said main process stream conduit;
   a rapid oxidation vessel connected to said backmixing vessel for rapidly oxidizing the backmixed sample;
   pH analyzing means operatively connected to said rapid oxidation vessel for continuous monitoring of the pH of the backmixed, oxidized sample; and
   control means operatively connected to said pH analyzing means and being operative in response to said analysis of said pH analyzing means for delivery of at least one reagent to said process stream through said inlet means to achieve a desired pH for said process stream.

6. The system of claim 5, further comprising an oxidation basin connected to said conduit downstream of said backmixing vessel connection.

7. The system of claim 5 further comprising a static mixing means for thoroughly mixing said reagent into said process stream, said static mixing means disposed in said conduit upstream from the point at which said backmixing vessel is coupled to said process stream and downstream from said inlet means for adding at least one reagent to said main process stream conduit.

8. A substantially continuous sulfide oxidation reaction system having continuous pH control of a process stream, said system comprising:
   input means for receiving an influent containing a sulfite;
   a sulfite oxidation reactor vessel;
   main process stream conduit means coupled between said inlet means and said oxidation reactor vessel providing substantially continuous flow of influent to said oxidation vessel;
   a backmixing vessel having input and output means and coupled to receive a continuous, predetermined volume sample portion of the process stream, said vessel providing greater than about 90% backmixing solely of the sample;
   static mixing means disposed in said main process stream conduit and being upstream from said backmixing vessel;
   a rapid oxidation vessel coupled to the output of said backmixing vessel, said rapid oxidation vessel providing substantially complete oxidation of said sample;
   pH analyzing means coupled to the rapid oxidation vessel to monitor pH of the backmixed, substantially oxidized sample;
   means for adding at least one reagent to said main process stream conduit upstream from said static mixer, said means being operatively connected to said pH analyzing means for delivery of the reagent to said process stream to achieve a desired pH for said process stream.

* * * * *